Aug. 23, 1927.
L. EWALD
1,639,933
FILTERING APPARATUS
Filed June 19, 1925   3 Sheets-Sheet 3
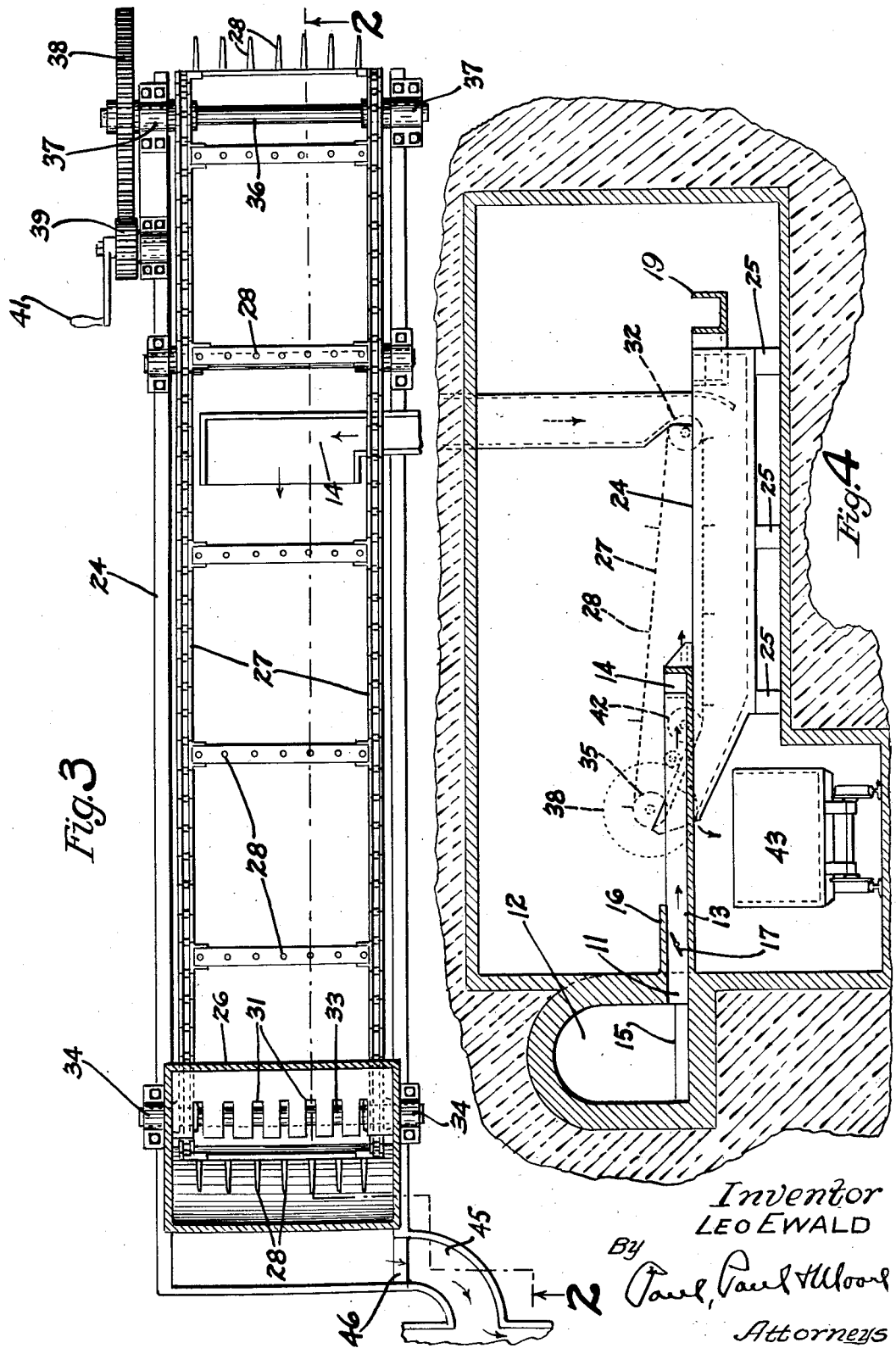
Inventor
Leo Ewald
By Paul, Paul & Moore
Attorneys Patented Aug. 23, 1927.

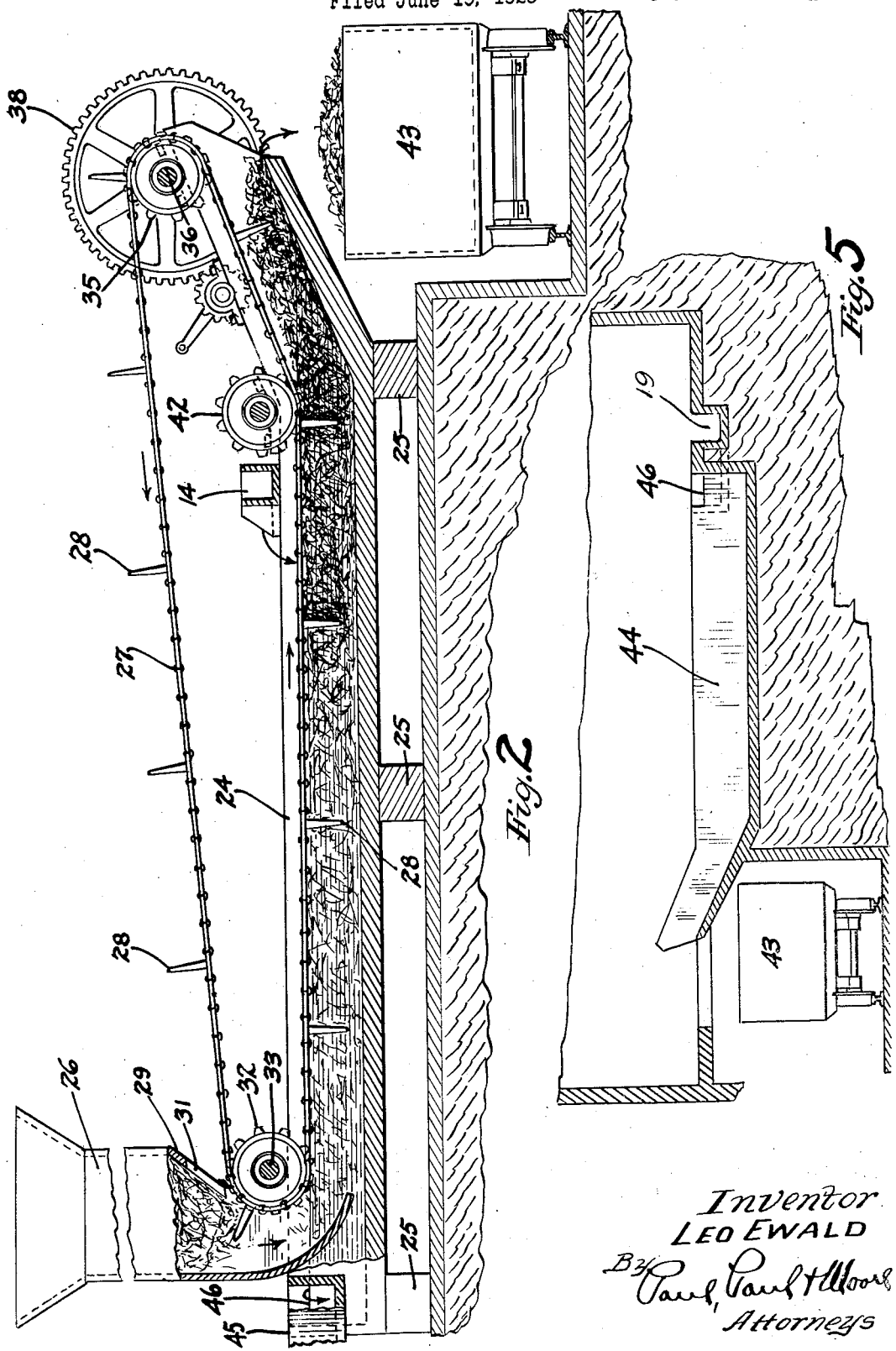

1,639,933

UNITED STATES PATENT OFFICE.

LEO EWALD, OF MINNEAPOLIS, MINNESOTA.

FILTERING APPARATUS.

Application filed June 19, 1925. Serial No. 38,255.

This invention relates to an improved filtering apparatus adapted for use to filter the sewage discharged from the sewers of a city for the purpose of removing the silt and solid material therefrom, so that the filtered water may be discharged into a river without danger of polluting the water.

An object of the invention is to provide a filtering apparatus adapted to be arranged alongside of a sewer trunk and having means for directing the sewage from the sewer into the filter for the purpose of removing the silt and impurities therefrom, and subsequently to return the filtered water to the same trunk for final discharge therefrom.

A further object is to provide such an apparatus comprising one or more filtering units or tanks for the purpose of increasing the capacity of the filter, said filtering units also being so arranged and having means whereby the sewage may be passed successively from one unit to the next whereby a more thorough filtering of the sewage may be obtained.

A further and more specific object of the invention is to provide a filtering apparatus comprising an endless conveyor adapted to feed the filtering material from a hopper into the filter tank, and such conveyor also functioning to remove the silt and heavy material from the filter and subsequently discharge it into a suitable receiving means.

The particular object of the invention therefore is to provide an improved filtering apparatus of simple and inexpensive construction, and which apparatus is an improvement over the form shown in my United States Patent #1,408,279.

Other objects of the invention will appear from the following description and the accompanying drawings and will be pointed out in the annexed claims.

In the drawings there has been disclosed a structure designed to carry out the various objects of the invention, but it is to be understood that the invention is not confined to the exact features shown as various changes may be made within the scope of the claims which follow.

In the accompanying drawings forming part of this specification,

Figure 2 is a longitudinal sectional view on the line 2—2 of Figure 3, showing the general construction of one of the filtering units;

Figure 3 is a plan view of Figure 2, partially in section;

Figure 4 is a sectional view on the line 4—4 of Figure 1, showing the preferred method of arranging the filter alongside of the sewer trunk and also showing the means provided for removing the silt and heavy material from the filter; and Figure 5 is a detail sectional view showing a modified construction.

Figure 1:
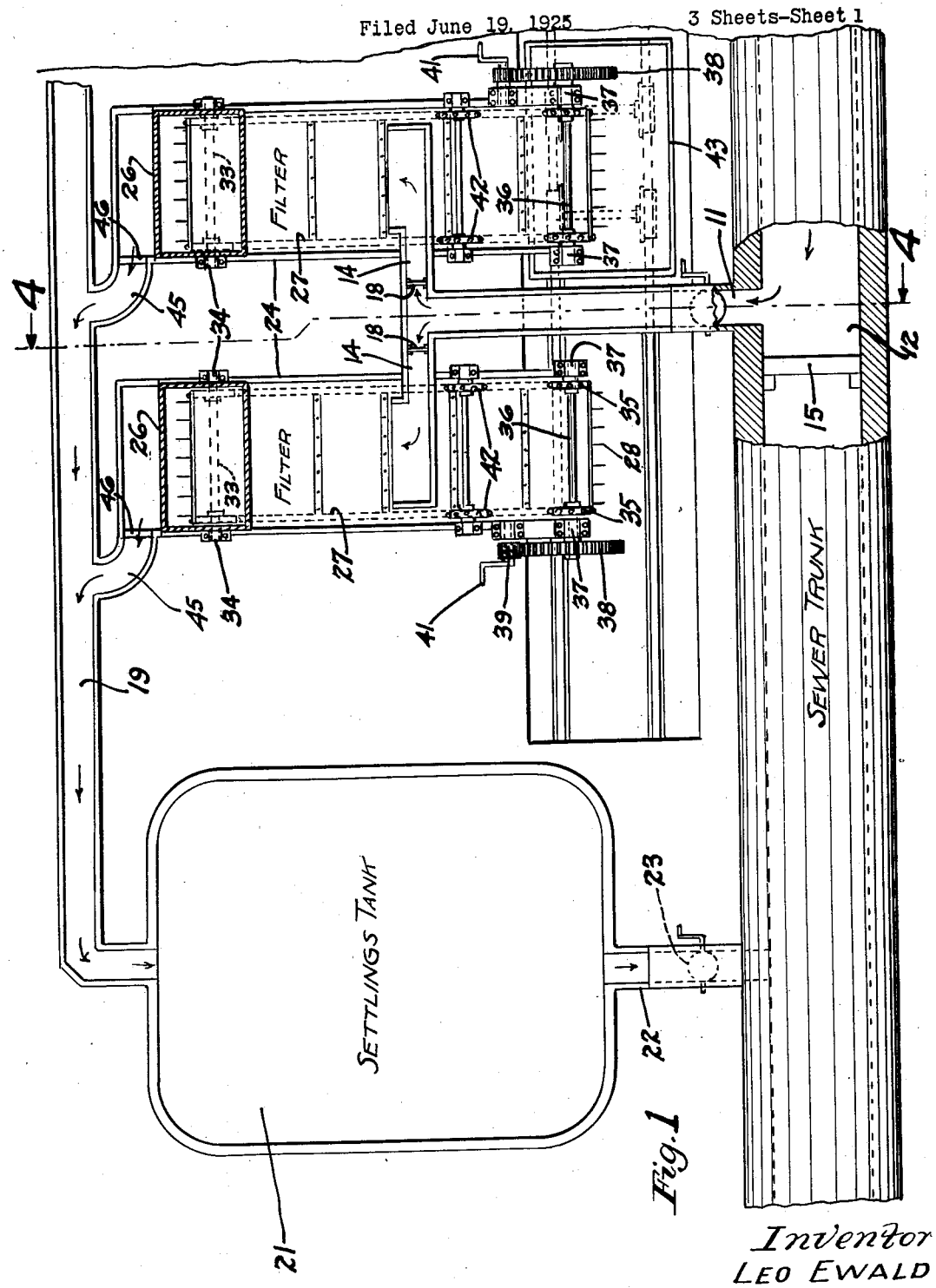
Figure 1 is a plan view showing a typical installation of my improved filtering apparatus connected to a sewer trunk.

The novel filtering apparatus featured in this invention, and as shown in Figure 1, comprises two filtering units or tanks preferably arranged in spaced parallel relation to each other It is to be understood that one or more such filtering units may be employed, depending upon the capacty of the filter or the degree of filtering desired before returning the filtered water to the sewer trunk. As here shown, a discharge opening 11 is provided in the sewer trunk 12 and this opening has a trough-like spout 13 connected therewith which outwardly extends from the trunk 12 and has the branches 14 terminally provided thereon for directing the sewage therefrom into the filtering units which will subsequently be described. A removable gate 15 is suitably mounted in the bottom of the sewer 12 to provide means for directing the sewage into the discharge opening 11 and therefore into the filters as indicated by the arrows in Figures 1 and 4. That portion of the trough 13 adjacent the trunk 12 is preferably closed by means of a wall 16 so that when the valve 17 mounted therein is in closed position, the flow of sewage through the trough 13 will be interrupted. The valve 17 also functions as a means to prevent the filters from being overflooded when the trunk 12 is filled with sewage and water such as in the case of heavy rains. When such occurrences arise, the valve 17 is preferably closed thereby causing all of the sewage which, of course, is intermixed with the flood waters flowing through the trunk to pass over the gate 15 to the discharge end of the sewer. Suitable gates 18 may also be provided in the branches 14 of the trough 13 so that the sewage may be directed to one or both of the filters as desired.

After the sewage is passed through the filters, the filtered water will be discharged therefrom into a receiving trough 19 from whence it may be discharged into a settlings tank 21 where any fine silt or sediment contained in the filtered water may be allowed to settle so that the water flowing from the tank 21 through the duct 22 and back to the main trunk 12 will be substantially clean and free from silt. A valve 23 is preferably provided in the duct 22 to provide means for closing the duct 22 to prevent flooding of the tank 21 when the trunk is filled with flood waters. If desired, however, the use of the supply tank 21 may be dispensed with in which case the trough 19 will be connected directly to the duct 22 so that the filtered water flowing therethrough will be discharged directly into the main trunk 12.

The filtering units of this novel filtering apparatus are similar in construction and therefore but one need be described. As shown in Figures 2 and 3, each filtering unit comprises an elongated tank or receptacle 24 preferably mounted upon suitable blocks 25 so that the bottom of the tank will be spaced from the floor. This, however, is not essential to the invention as the tank may, if desired, be placed directly upon the floor; the only object in raising the tank as shown, being to elevate the discharged end thereof to a more convenient height. A hopper 26 is provided at one end of the tank into which a suitable filtering material, such as straw, leaves, and the like, may be placed for feeding into the filter. The means provided for feeding the material from the hopper into the filter, preferably consists of an endless belt 27 having a plurality of suitable prongs or fingers 28 preferably arranged in rows thereon and several rows being spaced from one another as particularly shown in Figure 2. The lower inclined bottom 29 of the hopper 26 is provided with suitable slots 31 to receive the fingers 28 as the belt 27 is rotated. The feed end of the conveyor belt 27 is supported upon a pair of sprockets 32 mounted upon a transverse shaft 33 supported in suitable bearings 34 mounted on the upper edge of the tank as shown in Figure 3. The opposite end of the belt 27 is supported upon similar sprockets 35 mounted upon a shaft 36 which is rotatably mounted in bearings 37 as shown in Figure 3. A gear wheel 38 is mounted upon one end of the shaft 36 and is adapted to mesh with a drive pinion 39 which may be operated by means of a crank 41. The purpose of the gear 38 and pinion 39 is to provide means whereby the belt 27 may be rotated to feed the filtering material into the filter tank, and also for the purpose of discharging from the tank, the silt-laden or saturated filtering material during the process of filtering. It is to be understood that the operation of the belt 27 is intermittent, the rotation thereof being necessary only when the filtering material contained in the tank becomes so filled with silt and sediment that it becomes ineffective as a filtering means. When the above condition occurs, the crank 41 is rotated to actuate the belt 27 thereby causing the prongs 28 to feed new filtering material into the tank and at the same time to feed the saturated material out of the discharge end thereof into a suitable receiving means.

Referring to Figure 2, it will be noted that the discharge end of the tank 24 is arranged at an incline so that the discharge end thereof is substantially above the level of the sewage in the tank. This, of course, is necessary in order to prevent the sewage from flowing out through the discharge end of the tank. Also by thus raising the discharge end a considerable distance above the sewage level in the tank, less liquid will be carried out with the silt as it is discharged from the tank by the prongs 28. Idler sprockets 42 are preferably provided to retain the lower section or portion of the belt 27 in substantially parallel relation to the bottom of the tank.

As shown in Figures 2 and 4, a suitable receiving means, such as a truck 43, or carrier belt, may be provided for receiving the saturated filtering material as it is discharged from the filter tank. This truck may be mounted upon suitable rails so that the material which may be used for land fertilizing purposes may be conveniently conveyed from the filter to a suitable place for loading into wagons or trucks or incinerator. In Figure 5, there is shown a modified construction wherein the filter tank 44 is shown sunk into the floor so that the upper edge thereof will be substantially level with the floor. When thus mounted, the pit or runway for the truck 43 must necessarily be lowered an equal amount in order that suitable clearance be provided in the discharge end of the tank as shown.

In the operation of this novel filtering apparatus the sewage is directed from the main trunk 12, by means of the gate 15, into the discharge opening 11 provided in the wall of the trunk, thence through the trough 13 and the branches 14 into the filter tanks as indicated by the arrows in Figures 1 and 4. The liquid sewage will then gradually flow through the filtering material in the tank until it reaches the hopper end thereof where the liquid will flow through the curved discharge spouts 45 connecting the filter tanks with the receiving trough 19 as shown in Figure 1. An overflow board 46 is mounted in each discharge spout 45 and the top of these overflow boards determine the level of the sewage in the filtering tanks. As the liquid sewage continues to flow into the filtering tank, the silt and heavy material contained therein will be arrested or absorbed by the filtering material in the tank while the liquid will overflow the board or wall 46 in the curved discharge spout 45 and will thence be discharged into the receiving trough 19 for final discharging into the settlings tank 21 and thereafter the main trunk 12. As soon as the filtering material beneath the branch spout 14 becomes so saturated and filled with silt that it becomes ineffective as a filtering medium, the belt 27 will be rotated to discharge the silt-laden material from the tank into the truck 43 and at the same time new or fresh material will be fed into the opposite end of the tank to replace that removed therefrom.

By this novel structure apparatus, it will readily be seen that the liquid sewage received from the main truck may be filtered to almost any degree desired by providing more or less filtering units to obtain the proper degree of filtering. Also, if desired, the filtering material may be successively passed through a series of filtering units instead of passing it through them in parallel as shown in Figure 1. When it is successively passed through the filtering tanks, the first tank will preferably contain a coarse filtering material and the next one a finer filtering material or a coarse sand or gravel thereby providing means whereby the liquid will be thoroughly and completely filtered before being returned to the sewer for final discharge therefrom.

It is also to be understood that various changes and alterations may be made in the apparatus here shown and also that the belts 27 may be power driven instead of hand operated as shown.

Having thus described my invention, what I claim as new and desire to secure by Letters Patent is:

1. A device of the class described, comprising a tank, a feed hopper at the liquid discharge end of the tank, a belt having fingers arranged to rake fresh filter material downwardly from the hopper into the tank, said belt fingers also arranged to drag and distribute the material within the liquid, and to finally remove the same at a point remote from the liquid discharge end.

2. A device of the class described, comprising a tank, a feed hopper at the liquid discharge end of the tank, a belt having fingers adapted to enter the hopper and drag material therefrom into the tank, said belt fingers also arranged to drag and distribute the material within the liquid, and to finally remove the same at a point remote from the liquid discharge end.

3. A device of the class described, comprising a tank, a feed hopper at the liquid discharge end of the tank, a belt having fingers adapted to enter the hopper and drag material therefrom into the tank, said belt fingers also arranged to drag and distribute the material within the liquid, and to finally remove the same at a point remote from the liquid discharge end, said tank having a slanting bottom portion, having its highest point above the liquid level of the tank, whereby a used batch of material is caused to rise from and be discharged at a level above the tank liquid.

4. A device of the class described, comprising a tank having a bottom inclined at one end, a hopper over the tank remote from the inclined bottom, for supplying fresh filter material and having a throat, one wall of which has a series of downwardly opening slots therein, shafts arranged transversely thereof and over the tank, one beneath the hopper and one over the upper terminal of the inclined portion of the tank, each shaft having sprocket wheels and chains, bars cross-connecting the chains, each bar having a series of fingers adapted to enter the hopper through the slots to rake fresh material downwardly into the tank, idler sprockets engaging the lower runs of the chains above the junction of the angularly related meeting bottom portions, the lower runs of the chains disposed to cause the fingers to drag the material toward the discharge end and raise the same above the tank liquid for discharge.

5. A sewage filtering apparatus, comprising a tank, a hopper for supplying a fibrous filtering material, a conveyor belt having groups of prongs arranged to engage the hopper material, simultaneously feed said material to the tank, distribute the same therewithin, and discharge the material, and a conduit for delivering the sewage upon the fibrous material in the tank.

6. A device of the class described, comprising a tank having an upwardly slanting bottom at one end, the outer and uppermost portion of which is above the level of the liquid in the tank, a supply hopper having a delivery throat, including a wall having rows of prongs arranged to travel through the slots, said prongs further arranged to distribute the filter material within the liquid after delivery, and to subsequently remove the used material by dragging the same upwardly out of the liquid and discharging at a level thereabove.

7. A device of the class described, comprising a tank having an upwardly slanting bottom at one end, the outer and uppermost portion of which is above the level of the liquid in the tank, a supply hopper having a delivery throat, including a wall having slots therein, a conveyor belt having rows of prongs arranged to travel through the slots, said prongs further arranged to distribute the filter material within the liquid after delivery, and to subsequently remove the used material by dragging the same upwardly out of the liquid and discharging at a level thereabove, said throat having an opposite wall portion as a baffle beneath which the filtered liquid flows to be discharged.

8. In combination with a sewer main, including a valve-controlled sewage-delivery outlet, a filter tank arranged beneath the outlet, which outlet delivers at a point intermediate the ends of said tank, said tank arranged to deliver its loaded, used, filter material adjacent said sewer main, to a receptacle below and between said tank and main.

9. In combination with a sewer main, including a valve-controlled sewage-delivery outlet, a filter tank arranged beneath the outlet, which outlet delivers at a point intermediate the ends of said tank, said tank arranged to deliver its loaded, used, filter material adjacent said sewer main, to a receptacle below and beneath said tank and main, and a hopper for delivering fresh filter material adjacent the liquid discharge end of the tank, and having a throat including an extension as a baffle beneath which the filtered liquid flows on its way out of the tank.

10. In combination with a sewer main, including a sewage delivery outlet, a filter tank having a liquid discharge orifice remote from the main, said sewage delivery outlet arranged to deliver into the tank at a point intermediate the ends of said tank, and said tank constructed to deliver loaded filter material at a point adjacent the sewer main, from a point above the sewage level in the tank.

In witness whereof, I have hereunto set my hand this 15th day of June, 1925.

LEO EWALD.